July 1, 1930.     H. W. FLETCHER     1,769,636
METHOD OF FORMING TEETH ON CUTTERS
Filed Oct. 11, 1926
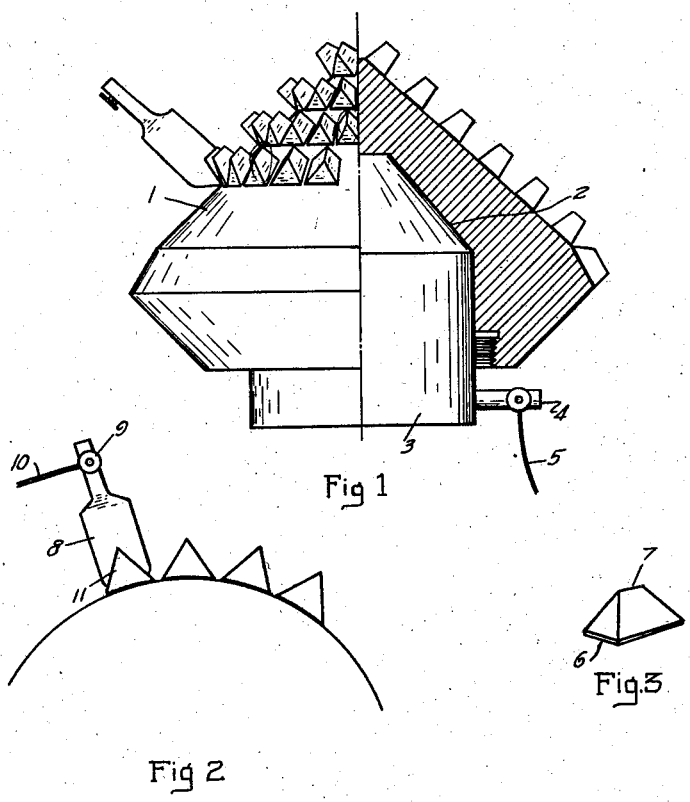
Harold W. Fletcher   Inventor
By   Jesse R. Stone   Attorney Patented July 1, 1930

1,769,636

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

METHOD OF FORMING TEETH ON CUTTERS

Application filed October 11, 1926. Serial No. 140,816.

My invention relates to forming teeth on cutters made of steel. It is particularly adapted for use on roller cutters, such as are employed on earth boring drills, designed for well drilling.

In forming cutters of this character, it is common to take a steel forging and carefully machine it to the proper size and then cut the teeth in the outer face by special milling cutters. This is a long and expensive operation, wasteful in material.

Furthermore, when a cutter once formed is used until dulled, the teeth cannot be resharpened but once, because of the limited thickness of the cutter body, and even then the gauge of the cutter is decreased.

By present methods of building up the surfaces of a dulled cutter by use of an arc welder or by use of an acetylene torch or the like, very objectionable results are obtained because of the inferior quality of the metal that can be deposited by such welding. When the cutters are thus built up and new teeth cut thereon, the substance of the cutting teeth is necessarily of impure or "dirty" steel and hence defective.

Again in forming cutters of this character where extremely heavy duty is required of the cutters, it is desirable that the body of the cutter be of tough ductile steel, but that the cutting teeth be hardened. This requires carbonizing of the cutters after the teeth are cut upon the body.

I aim to overcome the difficulties of the present methods of forming new teeth on old cutters, or of placing them on new cutter bodies, by separately forming the teeth, and butt welding them to the body of the cutter.

I have as an object the forming of new teeth by stamping, rolling, forging, or otherwise and fixing them to the cutter body quickly and inexpensively.

In the drawings, I have shown somewhat diagrammatically a device by means of which the process may be carried out.

Fig. 1 is a side view partly in central section of a cutter to which my invention is being applied. Fig. 2 is a broken end view of a cutter showing the application of the invention. Fig. 3 is a perspective elevation of one of the cutter teeth ready for use. Like numerals of reference are applied to like parts in all the views.

The process is carried out by first shaping the body 1, of the cutter, and I have shown a common type of rolling cutter employed on rock drills for well drilling operations. The body is approximately frusto-conical and is hollowed out internally to form a recess 2 to receive a bushing not shown, upon which it rotates in use.

After the body has been thus shaped and machined, the outer gauge of the body is less than the normal gauge of the cutters. A mandrel 3 is introduced into the recess 2 and it is contemplated that the mandrel will fit the recess closely. The mandrel may be of any conducting material such as copper or similar metal different from the steel of the cutter. Said mandrel has a post 4 thereon to which is attached a conducting wire 5, connected in some electric circuit.

The teeth may be of the desired form. In Fig. 3 one form of tooth is shown. It has a base 6 for attachment to the cutter body, and an outer cutting edge 7. The tooth is placed by hand or by any mechanical means in the proper position upon the surface of the cone 1. A welding rod or mandrel 8 of copper or similar conducting material, is then placed upon the tooth, a recess 11 therein fitting over the upper face of the tooth. The mandrel 8 is connected at 9 to a conducting wire 10 also forming a portion of the circuit including the wire 5 and a source of electricity.

The current is then turned on and the resistance set up when the steel tooth contacts with the steel cone 1 will heat up the surfaces of contact, and pressure exerted upon the mandrel 8 will cause the tooth to be welded upon the conical body. A series of teeth positioned upon the cone surface may be thus applied to the surface of the cutter until the cutter is completed. Very little, if any, further work upon the cutter will be required to put it in shape for use. It may be then heat-treated, if desired, and is complete. With the teeth made of suitable size the cutter is of normal gauge when thus completed.

While I have shown the process as being employed upon a certain type of cutter it is obvious that it is capable of wide application upon cutters of this character, and various changes in the construction of the apparatus as are necessary may be made without departing from the spirit of the invention.

The advantages of my improvement lie in the superior quality of the product obtained over that of the rebuilt cutters now made by processes previously mentioned. The cutter body may be of tough steel, uncarbonized if desired. The teeth may be separately formed of hardened steel and faced with hard material such as stellite. When such teeth are welded to the cutter body, a particularly advantageous cutter is obtained; not capable of production by other methods. The stellite teeth are not only wear-resisting, but are heat-resisting, and will operate advantageously on hot formations such as are encountered in steam wells and the like. The process is not only an economical one, but may be accomplished quickly; thus saving time and more expensive operating machinery.

What I claim as new and desire to protect by Letters Patent is:

1. A method of reclaiming worn rock bit cones, comprising the steps of milling off the worn teeth to obtain a smooth conical surface, independently forming individual teeth, suitably spacing these teeth upon the aforesaid smooth cone surface, and creating a metallic bond between the teeth and the cone, and repeating this operation in rows about the cone surface, whereby the cutting gauge of the cone is substantially the same as when originally constructed.

2. The art of forming rock bit cutters comprising forming the cutter body of a subnormal gauge, machining the surface thereof to form a tooth receiving face, independently forming the cutter teeth, bringing the gauge of the cutter to normal dimension by suitably spacing the individual teeth on the face thereof, and creating a metallic bond between the base of the teeth and the body face.

3. The method of forming rock bit cutters comprising forming the cutter body of tough material with a conical face, machining the surface thereof to bring it to the desired size, placing pyramidal shaped teeth of hard steel in concentric rows about said conical surface, welding said teeth to said body to bring the cutting area to the desired gauge, and heat treating the resulting cutter.

In testimony whereof I hereunto affix my signature this 6th day of October A. D. 1926.

HAROLD W. FLETCHER.